United States Patent
Minami et al.

(10) Patent No.: US 8,459,291 B2
(45) Date of Patent: Jun. 11, 2013

(54) SOURCE GAS CONCENTRATION CONTROL SYSTEM

(75) Inventors: Masakazu Minami, Kyoto (JP); Masaki Inoue, Kyoto (JP)

(73) Assignees: HORIBA, Ltd., Kyoto-shi (JP); HORIBA STEC, Co., Ltd., Kyoto-shi (JP)

(*) Notice: Subject to any disclaimer, the term of this patent is extended or adjusted under 35 U.S.C. 154(b) by 359 days.

(21) Appl. No.: 12/976,754

(22) Filed: Dec. 22, 2010

(65) Prior Publication Data

US 2011/0155264 A1 Jun. 30, 2011

(30) Foreign Application Priority Data

Dec. 24, 2009 (JP) ................. 2009-293533

(51) Int. Cl.
*B05C 11/00* (2006.01)
(52) U.S. Cl.
USPC ....... 137/93; 137/14; 137/87.05; 156/345.29; 118/689; 261/65
(58) Field of Classification Search
USPC ..... 137/14, 88, 93, 87.05, 87.06; 156/345.29; 118/688–692, 715; 261/65, 119.1
See application file for complete search history.

(56) References Cited

U.S. PATENT DOCUMENTS 8,047,510 B2 * 11/2011 Hirata et al. ................. 261/129

FOREIGN PATENT DOCUMENTS

JP 2008-282622 A 11/2008

* cited by examiner

*Primary Examiner* — Eric Keasel
(74) *Attorney, Agent, or Firm* — Alleman Hall McCoy Russell & Tuttle LLP

(57) ABSTRACT

To prevent loss of control of a pressure of a source gas within a movable range of a control valve, a source gas concentration control system is provided. The system may include a first valve that is provided on an outlet line, a concentration measurement part that measures a concentration of the source gas in mixed gas, and a concentration control part that controls a stroke of the first valve such that the measured concentration of the source gas becomes equal to a predetermined concentration setting. The measured concentration may be measured in the concentration measurement part. The system may further include a temperature controller that controls a temperature inside the tank to meet a temperature setting, and a temperature setting part that sets the temperature setting of the temperature controller.

5 Claims, 7 Drawing Sheets

SOURCE GAS CONCENTRATION CONTROL SYSTEM

TECHNICAL FIELD

The present invention relates to, in a source vaporization system that introduces carrier gas into a solid or liquid source contained in a tank to vaporize the source, a system that controls a concentration of the vaporized source gas.

BACKGROUND ART

A concentration control system that is used for this sort of source vaporization system and intended to keep a concentration of a source gas constant is under application by the present applicant. The concentration control system includes, on an outlet line through which mixed gas of carrier gas and the source gas is brought out of a tank: a first valve; a partial pressure measurement sensor that measures a partial pressure of the source gas; and a total pressure measurement sensor that measures a total pressure corresponding to a pressure of the mixed gas, and is provided with: a concentration measurement part that measures the concentration of the source gas in the mixed gas by dividing the measured partial pressure by the total pressure; and a concentration control part that controls a stroke of the first valve such that the measured concentration measured by the concentration measurement part becomes equal to a predetermined concentration setting.

According to the concentration control system configured as above, even if a source inside the tank is not vaporized at a saturated vapor pressure, and a state of the vaporization is varied to vary the partial pressure of the source gas, the total pressure of the mixed gas is controlled by the first valve to meet the variation. Accordingly, regardless of a generation situation of the source gas in the tank, the concentration of the source gas can be kept constant at the concentration setting.

CITATION LIST

Patent Literature

Patent literature 1: Japanese patent application No. 2008-282622

Meanwhile, if the concentration control is continued, an amount of the source in the tank is reduced, and thereby the partial pressure of the source gas to be vaporized is reduced. This is caused by a reduction in generation amount of the source, which is due to, in the case where the source is solid, a reduction in contact area with the carrier gas because of a reduction in surface area, or in the case where the source is liquid, a reduction in a period of time during which bubbles of the carrier gas can come into contact with the liquid because of lowering of liquid surface, a reduction in temperature inside the tank because of vaporization heat taken at the time of vaporization, or the like.

When the generation amount of the source gas is reduced to reduce the partial pressure of the source gas as described above, the above-described concentration control system controls the first valve to reduce the total pressure in order to keep the concentration of the source gas constant. In this case, in order to reduce the total pressure, the control is performed so as to further increase the stroke of the first valve.

However, the first valve has a movable range, and therefore if the first valve is fully opened, the total pressure of the mixed gas cannot be further reduced. Accordingly, if the partial pressure of the source gas becomes too low, the total pressure cannot be reduced to follow the partial pressure, and therefore the concentration of the source gas cannot be kept at the concentration setting.

Also, not only in the case of keeping the concentration constant, but also in the case of desirably keeping a flow rate of the source gas constant by controlling a flow rate of the carrier gas, due to the reduction in generation amount of the source gas, a stroke of a valve for controlling the flow rate of the carrier gas reaches an open limit degree, and therefore the flow rate control of the source gas may not be performed.

SUMMARY OF THE INVENTION

Technical Problem

The present invention is made in consideration of the above-described problem, and has an object to provide a source gas concentration control system that can prevent the occurrence of a situation where, for example, while the concentration of the source gas is kept constant at some concentration setting, the partial pressure of the source gas becomes very low, so that within the movable range of the valve, the total pressure corresponding to the partial pressure of the source gas cannot be achieved, and therefore the concentration of the source gas cannot be kept constant at the concentration setting. The present invention also has an object to provide a source gas flow rate control system that can prevent the occurrence of a situation where the generation amount of the source gas is reduced, and thereby the flow rate of the source gas cannot be kept constant.

Solution to Problem

Accordingly, a source gas concentration control system of the present invention is used for a source vaporization system including: a tank that contains a source; an inlet line that introduces carrier gas for vaporizing the contained source into the tank; and an outlet line that leads out mixed gas of source gas produced by the vaporization of the source and the carrier gas from the tank, and includes: a first valve that is provided on the outlet line; a concentration measurement part that measures a concentration of the source gas in the mixed gas; a concentration control part that controls a stroke of the first valve such that the measured concentration of the source gas becomes equal to a predetermined concentration setting, the measured concentration being measured in the concentration measurement part; a temperature controller that controls a temperature inside the tank so as to make the temperature inside the tank become equal to a temperature setting; and a temperature setting part that sets the temperature setting of the temperature controller, wherein if the stroke of the first valve exceeds a threshold stroke that is set on the basis of a limit stroke of an open side in a movable range, the temperature setting part changes the temperature setting to a higher temperature than the temperature setting that is set at the time.

Also, a program used for a source gas concentration control system of the present invention is one used for a source gas concentration control system including: a first valve that is provided on an outlet line; a concentration measurement part that measures a concentration of source gas in mixed gas; a concentration control part that controls a stroke of the first valve such that the measured concentration of the source gas becomes equal to a predetermined concentration setting, the measured concentration being measured in the concentration measurement part; and a temperature controller that controls a temperature inside a tank to meet a temperature setting; and includes a temperature setting part that sets the temperature setting of the temperature controller, wherein if the stroke of the first valve exceeds a threshold stroke that is set on the basis of a limit stroke of an open side in a movable range, the temperature setting part changes the temperature setting to a higher temperature than the temperature setting that is set at the time.

If so, even if while the concentration control is continued such the concentration of the source gas becomes equal to the concentration setting, a generation amount of the source gas is reduced to reduce a partial pressure of the source gas, and in order to keep the concentration of the source gas at the concentration setting, a total pressure is kept reduced to bring the stroke of the first valve close to the limit stroke of the open side, the temperature setting part sets, at the time, the temperature setting to a higher temperature than a temperature at the time of reaching the threshold stroke of the open side to increase a saturated vapor pressure of the source gas, and thereby the generation amount of the source gas can be increased to increase the partial pressure of the source gas. Accordingly, to keep the concentration constant when the partial pressure of the source gas is increased, the total pressure is also required to be increased, and therefore the stroke of the valve is controlled to a stroke on a closing side more than a stroke at the time of exceeding the threshold stroke of the open side. That is, in the case where the partial pressure of the source gas is reduced lower than a value of some limit, the temperature setting part changes the temperature setting to a higher temperature to increase the partial pressure of the source gas, and therefore the concentration control is not performed with the stroke of the first valve being close to the limit stroke of the open side, but can be performed on the central side of the movable range with having enough of a margin.

As described, there can be prevented a situation where due to the reduction in partial pressure of the source gas, the concentration control is required in a range exceeding the movable range of the first valve, and the first valve is stopped at the stroke of the limit stroke of the open side to make it impossible to perform the concentration control.

Further, according to the source gas concentration control system having such a configuration, the first valve is used to control the total pressure, and thereby the concentration control that allows the partial pressure of the source gas to be varied can be achieved, so that it is not necessary to more strictly control the generation amount of the source gas by temperature control. Accordingly, to perform the concentration control, the temperature controller and temperature setting part are only required to be able to respond to a special situation of exceeding the movable range of the first valve, and therefore it is not necessary to use a temperature control device having too much accuracy. Accordingly, it is not necessary to use a high performance device, and therefore only by using the simple and inexpensive temperature controller and temperature setting part, there can be prevented the problem as described above that by exceeding the movable range of the first valve, the concentration control cannot be performed.

If after the situation where the stroke of the first valve reaches or comes close to the threshold stroke of the open side has been detected, the temperature control is started, due to the delay of the temperature control, inertia acts to reduce the partial pressure of the source gas, and therefore the first valve may reach the limit stroke of the open side. To prevent such a problem, the threshold is only required to be changed according to the variation rate of the stroke of the first valve. If so, by making a setting such that in the case where the variation rate is large, in consideration of a margin, a difference between the threshold stroke of the open side and the limit stroke of the open side is made large, whereas in the case where the variation rate is small, the difference in stroke is made small, or making other setting, secure concentration control that is likely to avoid the situation where the control becomes impossible can be performed.

A configuration may be provided such that the partial pressure of the source gas is monitored, and when the partial pressure is reduced, the partial pressure is increased to some extent to enable the concentration control to be performed within the movable range of the stroke of the first valve. Specifically, it is only necessary that a source gas concentration control system is used for a source vaporization system including: a tank that contains a source; an inlet line that introduces carrier gas for vaporizing the contained source into the tank; and an outlet line that leads out mixed gas of source gas produced by the vaporization of the source and the carrier gas from the tank, and includes: a first valve that is provided on the outlet line; a partial pressure measurement sensor that measures partial pressure of the source gas; a total pressure measurement sensor that measures a total pressure of the mixed gas; a concentration measurement part that measures a concentration of the source gas in the mixed gas on the basis of the partial pressure and the total pressure; a concentration control part that controls a stroke of the first valve such that the measured concentration of the source gas becomes equal to a predetermined concentration setting, the measured concentration being measured in the concentration measurement part; a temperature controller that controls a temperature inside the tank so as to make the temperature inside the tank become equal to a temperature setting; and a temperature setting part that sets the temperature setting for the temperature controller, wherein if the partial pressure measured by the partial pressure measurement sensor falls below a lower limit threshold for partial pressure that is set on the basis of a limit stroke of the open side in a movable range of the first valve, the temperature setting part changes the temperature setting to a higher temperature than the temperature setting that is set at the time.

To prevent the situation where the stroke of the first valve reaches the limit stroke of the open side to make it impossible to perform the concentration control, a method other than the method that uses the temperature control to adjust the partial pressure of the source gas may be used. Specifically, it is only necessary that a source gas concentration control system is used for a source vaporization system including: a tank that contains a source; an inlet line that introduces the carrier gas for vaporizing the contained source into the tank; and an outlet line that leads out mixed gas of source gas produced by the vaporization of the source and the carrier gas from the tank, and includes: a first valve that is provided on the outlet line; a concentration measurement part that measures a concentration of the source gas in the mixed gas; a concentration control part that controls a stroke of the first valve such that the measured concentration of the source gas becomes equal to a predetermined concentration setting, the measured concentration being measured in the concentration measurement part; an auxiliary valve that is provided on an upstream or downstream side of the first valve; and an auxiliary valve control part that controls a stroke of the auxiliary valve, wherein if the stroke of the first valve exceeds a threshold stroke of the open side that is set on the basis of a limit stroke of the open side in a movable range, the auxiliary valve control part changes the stroke of the auxiliary valve to make a stroke on the open side more than the stroke that is set at the time. If so, when the first valve comes close to the limit stroke of open side, the stroke of the auxiliary valve is made larger to secondarily further reduce the total pressure, and thereby the concentration can be kept constant at the concentration setting corresponding to the reduction in partial pressure of the source gas.

Similarly to the case of preventing the occurrence of the situation where the partial pressure is too much reduced, and thereby even if the first valve reaches the limit stroke of the open side, the concentration cannot be made to reach the concentration setting, a configuration may be provided to be able to avoid a problem that the partial pressure is too much increased, and thereby even if in order to correspondingly increase the total pressure, the first valve is made to reach a closing limit stroke, the concentration cannot be made to reach the concentration setting. Specifically, it is only necessary that a source gas concentration control system is used for a source vaporization system including: a tank that contains a source; an inlet line that introduces carrier gas for vaporizing the contained source into the tank; and an outlet line that leads out mixed gas of source gas produced by the vaporization of the source and the carrier gas from the tank, and includes: a first valve that is provided on the outlet line; a concentration measurement part that measures a concentration of the source gas in the mixed gas; a concentration control part that controls a stroke of the first valve such that the measured concentration of the source gas becomes equal to a predetermined concentration setting, the measured concentration being measured in the concentration measurement part; a temperature controller that controls a temperature inside the tank so as to make the temperature inside the tank become equal to a temperature setting; and a temperature setting part that sets the temperature setting for the temperature controller, wherein if the stroke of the first valve falls below a closing side threshold stroke that is set on the basis of a closing limit stroke of a movable range, the temperature setting part changes the temperature setting to a lower temperature than the temperature setting that is set at the time.

In the case of not keeping the concentration of the source gas in the mixed gas constant but desirably keeping a flow rate of the source gas substantially constant, due to a reduction in generation amount of the source gas caused by a reduction in source, or other reason, even if a valve for flow rate control reaches a limit stroke of the open side, sometimes the flow rate cannot be made to reach a flow rate setting. To prevent such a problem, it is only necessary that a source gas flow rate control system is used for a source vaporization system including: a tank that contains a source; an inlet line that introduces carrier gas for vaporizing the contained source into the tank; and an outlet line that leads out mixed gas of source gas produced by the vaporization of the source and the carrier gas from the tank, and includes: a second valve that is provided on the inlet line; a source gas flow rate measurement part that measures a flow rate of the source gas; a source gas flow rate control part that controls a stroke of the second valve such that the measured flow rate of the source gas becomes equal to a predetermined flow rate setting, the measured flow rate being measured in the source gas flow rate measurement part; a temperature controller that controls a temperature inside the tank so as to make the temperature inside the tank become equal to a temperature setting; and a temperature setting part that sets the temperature setting of the temperature controller, wherein if at a time the stroke of the second valve exceeds a threshold stroke of the open side that is set on the basis of a limit stroke of the open side in a movable range, the temperature setting part changes the temperature setting to a higher temperature than the temperature setting that was set at the time. If so, when the second valve comes close to the limit stroke of the open side, the temperature inside the tank is increased to increase a generation amount of the source gas, and thereby the control becomes possible with the stroke of the second valve being placed on a central side of the movable range, so that a situation where the flow rate of the source gas cannot be controlled can be avoided, and the source gas can be constantly flowed at a constant flow rate.

Advantageous Effects of Invention

As described, according to the source gas concentration control system of the present invention, before the partial pressure of the source gas is reduced during the concentration control, and thereby the stroke of the first valve comes close to the limit stroke of the open side to make it impossible to further continue the concentration control, the temperature setting part increases the temperature setting to attempt to increase the partial pressure of the source gas to some extent, so that the total pressure to be achieved also increases to thereby be able to surely perform the concentration control within the movable range of the first valve, and a problem that the first valve reaches the limit stroke of the open side and cannot be further operated, and thereby the concentration control becomes impossible, can be prevented.

DETAILED DESCRIPTION OF THE EMBODIMENTS

Figure 1:
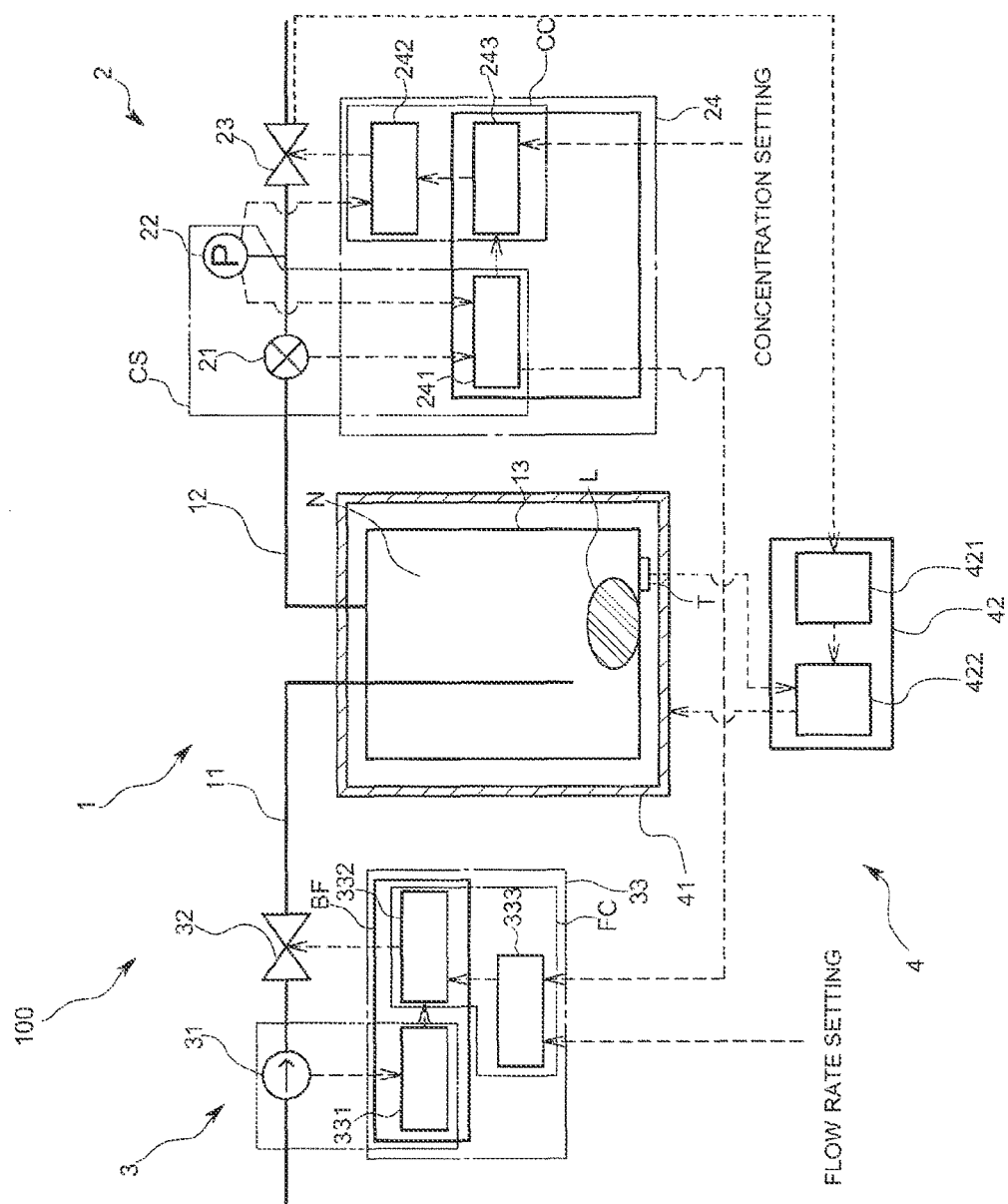
FIG. 1 is a diagram illustrating a schematic structure of a source gas concentration control system according to one embodiment of the present invention.

One embodiment of the present invention is described below referring to the drawings.

A source gas concentration control system 100 of the present embodiment is used to, for example, supply TMIn (trimethylindium) at a constant concentration to an MOCVD deposition system, which is one of semiconductor manufacturing systems. More specifically, the source gas concentration control system 100 is used for a bubbling system 1 that vaporizes a solid source of TMIn to supply the vaporized source to a chamber serving as a deposition chamber. Note that TMIn corresponds to a source in the Claims, and the bubbling system 1 corresponds to a source vaporization system in the Claims. In addition, even if the source is a liquid source, the present invention produces the same effects. Also, the source gas concentration control system of the present invention is not limited to concentration control of the source gas produced by the vaporization of the solid source of TMIn. The source gas concentration control system can also be used for, for example, a CVD deposition system, and the like, and used to stably supply an IPA (isopropyl alcohol) concentration inside a dry processing chamber of a wafer cleaning system used for semiconductor manufacturing processing. In addition, without limitation to manufacturing processing for a semiconductor, an FPD, an optical device, a MEMS, or the like, the source gas concentration control system can be used for a gas supply unit using the bubbling system 1.

As illustrated in FIG. 1, the bubbling system 1 is one that is provided with: a tank 13 that retains a source L; an inlet line 11 that introduces carrier gas into the source L retained in the tank 13 to cause bubbling; and an outlet line 12 that leads out mixed gas of source gas produced by vaporization of the source L and the carrier gas from an upper space N above the source L retained in the tank 13. The tank 13 is attached with a temperature sensor T for measuring a temperature inside the tank 13.

The source gas concentration control system 100 is one that includes: a mass flow controller 3 that is provided in the inlet line 11 and intended to control a flow rate of the carrier gas; and a concentration controller 2 that is provided in the outlet line 12 and intended to control a concentration of the source gas in the mixed gas. The concentration controller 2 of the present embodiment is one that controls a total pressure of the mixed gas to control the concentration. Further, in addition to such a configuration, the present source gas concentration control system 100 is further provided with a temperature control mechanism for keeping the temperature inside the tank 13 constant.

Figure 2:
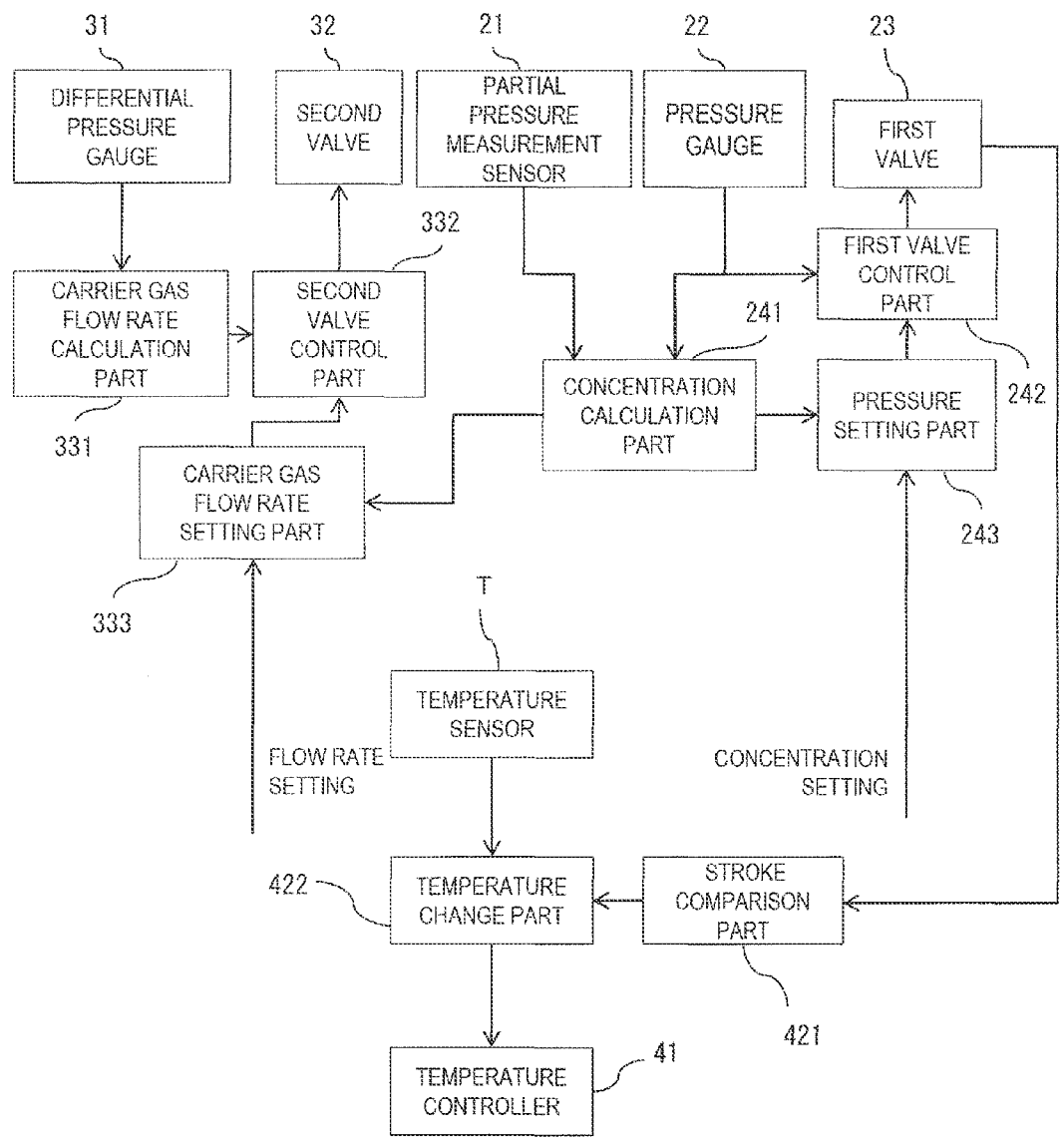
FIG. 2 is a functional block diagram of the source gas concentration control system in the same embodiment.

In the following, referring to FIGS. 1 and 2, the respective devices are described on a part basis in detail in the order of the concentration controller 2, the mass flow controller 3, and the temperature control mechanism.

<Configuration of Concentration Controller>

The concentration controller 2 is one that is provided with: a concentration measurement part CS that measures a concentration of the source gas in the mixed gas; a pressure gauge 22 serving as a pressure measurement part that measures a pressure (total pressure) of the mixed gas, which corresponds to a pressure inside the tank 13; and a first valve 23 that is intended to control the total pressure of the mixed gas by a stroke of a valving element, from an upstream side in this order, and further provided with a concentration controller control part 24. Note that, in order to control the concentration of the source gas in the mixed gas, the pressure gauge 22 should be provided on a side more upstream than the first valve 23. This is intended to enable the total pressure inside the tank 13 to be accurately measured and the concentration of the source gas in the mixed gas to be accurately calculated to meet a variation in vaporization state of the source L.

The concentration measurement part CS is one that is provided with: a partial pressure measurement sensor 21 that measures a partial pressure of the source gas on the basis of a non-dispersive infrared absorption method; and a concentration calculation part 241 that, on the basis of the partial pressure of the source gas measured by the partial pressure measurement sensor 21 and the total pressure serving as a measured pressure measured by the pressure gauge 22, calculates the concentration of the source gas in the mixed gas. Note that the concentration of the source gas in the mixed gas is calculated by dividing the partial pressure of the source gas by the total pressure of the mixed gas. Such a concentration calculation method is derived on the basis of a gas state equation.

The concentration controller control part 24 includes the above-described concentration calculation part 241 and a concentration control part CC. The concentration control part CC is one that controls the first valve 23 such that the measured concentration measured by the concentration measurement part CS consequently becomes equal to a predetermined concentration setting, and includes a first valve control part 242 and a pressure setting part 243 that sets the pressure setting for the first valve control part 242.

The first valve control part 242 is one that controls the stroke of the first valve 23 such that the pressure (total pressure) measured by the pressure gauge 22 becomes equal to the pressure setting that is a pressure set by the pressure setting part 243.

The pressure setting part 243 is one that, in a certain period of time after the concentration setting has been changed, sets the pressure setting to a tentative pressure setting that is a pressure inside the tank calculated by an after-mentioned total pressure calculation part 244, and in the other period of time, changes the predetermined pressure setting so as to decrease a deviation between the measured concentration measured by the concentration measurement part CS and the concentration setting.

Specifically, if the measured concentration is higher than the concentration setting, a concentration is expressed by partial pressure/total pressure, and therefore by increasing the total pressure, the concentration can be reduced. Accordingly, if the measured concentration is higher than the concentration setting, the pressure setting part 243 changes the pressure setting such that the first valve control part 242 increases the total pressure. As a result, the first valve control part 242 performs a control to decrease the stroke of the first valve 23. If the measured concentration is lower than the concentration setting, the opposite of this manner will be employed.

Changing the pressure setting to decrease the deviation between the measured concentration and the concentration setting refers to, in the case where the measured concentration is higher than the concentration setting, changing the pressure setting to a higher value, and in the case where the measured concentration is lower than the concentration setting, changing the pressure setting to a lower value.

In addition, the concentration controller control part 24 is one that uses a computer, and is provided with an internal bus, a CPU, a memory, an I/O channel, an A/D converter, a D/A converter, and the like. Also, the CPU and peripheral devices operate according to a predetermined program stored in the memory in advance, and thereby the concentration controller control part 24 is adapted to fulfill functions as the first valve control part 242, the concentration calculation part 241, and the pressure setting part 243. Here, only the first valve control part 242 is adapted to include a control circuit, such as an independent one-chip microcomputer, and receive the pressure setting. With the pressure gauge 22 and first valve 23 are formed as one unit, the first valve control part 242 is configured to be able to easily perform the pressure control by a mere input of the pressure setting. Such a configuration of the control part enables a control circuit and software, which have been conventionally developed for pressure control, to be used for the concentration control, and therefore design and development costs can be prevented from being increased.

As described, the concentration controller 2 performs the concentration control of the mixed gas by itself.

<Configuration of Mass Flow Controller>

Next, respective parts of the mass flow controller 3 are described. The mass flow controller 3 is one that is provided with: a thermal type flowmeter 31 serving as a flow rate measurement part that measures a mass flow rate of the carrier gas flowing into the inlet line 11; and a second valve 32 that adjusts the flow rate of the carrier gas on the basis of a stroke of a valving element, from an upstream side in this order, and further provided with a mass flow controller control part 33. As the flow rate measurement part, a differential pressure type may be used.

The mass flow controller control part 33 includes: a carrier gas flow rate calculation part 331 that, on the basis of a signal from the thermal type flowmeter 31, calculates the flow rate of the carrier gas; and a flow rate control part FC that, on the basis of the measured concentration of the source gas and the measured flow rate of the carrier gas, calculates a flow rate of the source gas or mixed gas flowing through the outlet line 12, and controls the stroke of the second valve 32 such that the calculated flow rate becomes equal to a predetermined flow rate setting.

The flow rate control part FC is one that is provided with a second valve control part 332, and a carrier gas flow rate setting part 333 that sets the flow rate setting for the second valve control part 332.

The second valve control part 332 is one that controls the stroke of the second valve 32 such that the measured carrier gas flow rate becomes equal to a carrier gas flow rate setting set by a carrier gas flow rate setting part 333.

The carrier gas flow rate setting part 333 is one that changes a predetermined carrier gas flow rate setting to decrease a deviation between the calculated flow rate and the flow rate setting having been set. To specifically describe the decrease of the deviation between the calculated flow rate and the flow rate setting having been set, assuming that if the calculated flow rate of the source gas or mixed gas is larger than the flow rate setting of the source gas or mixed gas, the concentration is kept constant by the concentration control part CC, and the carrier gas flow rate setting is changed for the second valve control part 332 so as to decrease the flow rate of the carrier gas that flows in. If the calculated flow rate is smaller than the flow rate setting, the opposite of this manner is employed. This is because a concentration is expressed by partial pressure/total pressure, and therefore also expressed by (mass flow rate of source gas)/(total mass flow rate=mass flow rate of source gas+mass flow rate of carrier gas), so that if the concentration is kept constant, increasing/decreasing the mass flow rate of the carrier gas directly enables the mass flow rate of the source gas and the total flow rate to be increased/decreased. Note that if the calculated flow rate is smaller than the flow rate setting, an operation opposite to the case where the calculated flow rate is larger than the flow rate setting will be performed.

Note that the carrier gas flow rate calculation part 331 and the second valve control part 332 are ones that function by a control circuit BF and the like provided with a CPU, a memory, an I/O channel, an A/D converter, a D/A converter, and the like. The control circuit BF is one that is specialized for flow rate control, and configured to receive a signal of a flow rate setting value, which is a value of the flow rate to be controlled by the mass flow controller 3, and a signal from the thermal type flowmeter 31. Also, the carrier gas flow rate setting part 333 is one of which a function is realized by a general-purpose one-chip microcomputer or the like.

As described, the mass flow controller 3 is one that only performs the flow rate control of the carrier gas in the inlet line 11, and consequently performs the flow rate control of the source gas or mixed gas.

<Operation of Concentration Controller and Mass Flow Controller>

Figure 3:
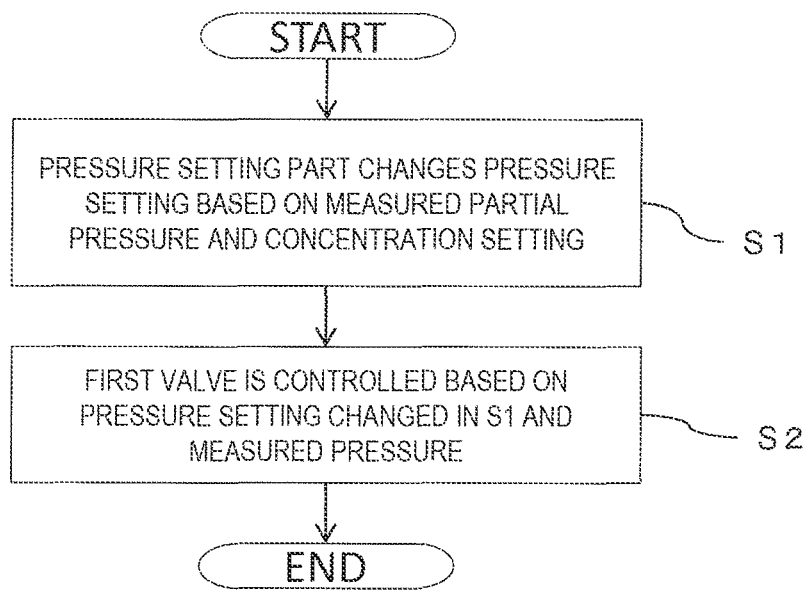
FIG. 3 is a flowchart illustrating concentration control operation of the source gas concentration control system in the same embodiment.
Figure 4:
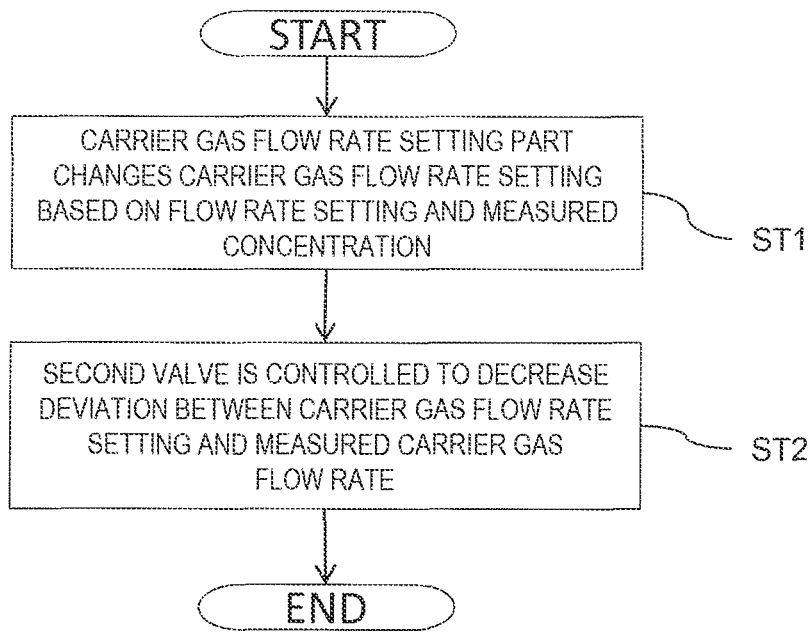
FIG. 4 is a flowchart illustrating flow rate control operation of the source gas concentration control system in the same embodiment.

Next, concentration control operation for the source gas in the mixed gas, and flow rate control operation for the mixed gas and source gas, are described referring to flowcharts of FIGS. 3 and 4.

First, operation for the case where the concentration control is performed by controlling the stroke of the first valve 23 to as to meet the concentration setting having been set is described referring to FIG. 3.

On the basis of the partial pressure of the source gas, which is measured by the partial pressure measurement sensor 21, and the total pressure of the mixed gas, which is measured by the pressure gauge 22, the concentration calculation part 241 calculates the concentration of the source gas in the mixed gas from Expression (1):

$$C = Pz/Pt \tag{1}$$

Here, C represents the concentration, Pz the partial pressure of the source gas, and Pt the total pressure of the mixed gas.

During normal operation, if the concentration measured by the concentration measurement part is different from the concentration setting set by the pressure setting part 243, on the basis of the partial pressure Pz of the source gas measured by the partial pressure measurement sensor 21 and the concentration setting C0, from Expression (2), the pressure setting part 243 changes the pressure setting Pt0 as follows (Step S1):

$$Pt0 = Pz/C0 \tag{2}$$

Here, Pz represents a value that is constantly measured by the partial pressure measurement sensor 21, and C0 represents the concentration having been set and is therefore already known.

When the pressure setting is changed to Pt0, the first valve control part 242 controls the stroke of the first valve 23 so as to decrease a deviation between the pressure (total pressure) Pt measured by the pressure gauge 22 and the pressure setting Pt0 (Step S2).

If the partial pressure Pz of the source gas is not varied while the measured pressure Pt is made to follow the pressure setting Pt0, the concentration of the source gas in the mixed gas, which is finally measured, will be the concentration setting C0.

If the partial pressure Pz of the source gas is varied during the following, the pressure setting part 234 again changes the pressure setting Pt0 on the basis of Expression (2) to achieve the concentration setting C0.

Next, the flow rate control of the source gas or the total flow rate in the outlet line 12 is described referring to FIG. 4. Note that regardless of the above-described concentration control by the concentration controller 2, the mass flow controller 3 controls the flow rate of the carrier gas.

It is assumed that the flow rate setting Qz0 of the source gas is set in the carrier gas flow rate setting part 333. First, between the flow rate and the concentration, there is a relationship as expressed by the following Expression (3):

$$C = Pz/Pt = Qz/Qt = Qz/(Qc+Qz) \tag{3}$$

Here, Qz represents the mass flow rate of the source gas, Qt the mass flow rate of the mixed gas, and Qc the mass flow rate of the carrier gas.

The carrier gas flow rate setting part 333 sets the carrier gas flow rate setting Qc0 from the following Expression (4) obtained by modifying Expression (3) (Step ST1):

$$Qc0=Qz0(1-C)/C \qquad (4)$$

Here, the concentration C has a value that is constantly measured by the concentration measurement part CS, and Qz0 has a value having been set and is therefore already known.

When the carrier gas flow rate setting is changed to Qc0, the second valve control part 332 controls the stroke of the second valve 32 so as to decrease a deviation between the carrier gas flow rate Qc measured in the flow rate measurement part and the carrier gas flow rate setting Qc0 decreases (Step ST2).

If the concentration C is not varied while the measured carrier gas flow rate Qc is made to follow the carrier gas flow rate setting Qc0, the flow rate of the measured carrier gas, which is finally measured, will be the carrier gas flow rate setting Qc0.

If the concentration C is varied during the following, the carrier gas flow rate setting part 333 again sets the carrier gas flow rate setting Qc0 from Expression (4) to achieve the predetermined source gas flow rate Qz0.

As described, a configuration is provided such that the concentration controller 2 and the mass flow controller 3 collaborate with each other, and thereby the concentration control is performed using as a control parameter the total pressure that can be easily controlled by the first valve 23, and therefore even if the source gas is not sufficiently vaporized to a saturated vapor pressure or there is variation in vaporization, the concentration of the source gas in the mixed gas can be kept constant at the concentration setting.

Configuration of Temperature Control Mechanism

Next, a configuration and operation of the temperature control mechanism 4 are described. The temperature control mechanism 4 includes: a temperature controller 41 that controls a temperature to achieve a temperature setting of the bubbling system 1; and a temperature setting part 42 that sets the temperature setting of the temperature controller 41.

The temperature controller 41 is a heater, and one that obtains the temperature inside the tank from the temperature sensor T and performs on/off control such that the measured temperature becomes equal to a temperature setting. Also, the temperature controller 41 and tank are surrounded by a heat insulating tank. The temperature controller 41 may be one that performs PID control to keep the temperature inside the tank constant.

The temperature setting part 41 is configured to, if the stroke of the first valve 23 exceeds a threshold stroke of an open side that is set on the basis of the limit stroke of the open side in the movable range, change the temperature setting to a higher temperature than the temperature setting that is set at the time.

More specifically, the temperature setting part 42 is one of which a function is realized by a computer or the like, and includes: a stroke comparison part 42 that obtains the stroke of the first valve 23 and compares whether or not the measured stroke exceeds the threshold stroke of the open side; and a temperature change part 422 that, if the measured stroke exceeds the threshold stroke of the open side in the stroke comparison part 421, changes the temperature setting to a higher temperature than the current one.

The stroke comparison part 421 is configured to change the threshold stroke of the open side to be set on the basis of a characteristic of the source, or a variation rate of the stroke with time. Specifically, the stroke comparison part 421 is one that, as the variation rate of the stroke of the first valve 23 increases, correlatively to this, sets the threshold stroke of the open side to increase an absolute value of a difference between the limit stroke of the open side and the threshold stroke of the open side. Then, if the stroke of the first valve 23 exceeds the threshold stroke of the open side, the stroke comparison part 421 transmits a signal that communicates this to the temperature change part 422.

When the stroke of the first valve 23 exceeds the threshold stroke of the open side, the temperature change part 422 changes the temperature setting, which is currently set, to a higher temperature than the current temperature setting. Setting the temperature setting to a higher temperature than the current one is, in the present embodiment, adapted to make an increase by a predetermined temperature amount. For example, a configuration is provided to increase the temperature setting so as to perform the concentration control near substantially a central value within the movable range of the stroke of the first valve 23.

Operation of the temperature control mechanism 4 for the case where, in the source gas concentration control system 100 configured as described above, the partial pressure of the source gas generated from the tank 13 is reduced, is described.

In the case where the concentration controller 2 keeps the concentration of the source gas constant at the concentration setting, as time passes, an amount of the gas vaporized from the source is decreased because of a reduction in source amount, or the like. When the generation amount of the source gas is reduced, the partial pressure of the source gas in the tank 13 is reduced. In order to keep the concentration constant, the concentration controller 2 performs a control to increase the stroke of the first valve 23 to the open side so as to reduce the total pressure of the mixed gas to meet the reduction in partial pressure of the source gas.

While the concentration of the source gas is kept constant at the concentration setting, and the stroke of the first valve 23 does not reach the threshold stroke of the open side, the stroke comparison part 421 monitors the variation rate of the stroke of the first valve 23, and changes the threshold stroke of the open side on the basis of the variation rate for every sampling or constant period. Then, when the stroke comparison part 421 compares the stroke of the first valve 23 with the threshold stroke of the open side, and determines that the stroke exceeds the threshold stroke of the open side, it transmits this to the temperature change part 422.

The temperature change part 422 increases the temperature setting from the temperature setting currently set by a predetermined value to change it to a new temperature setting.

Figure 5:
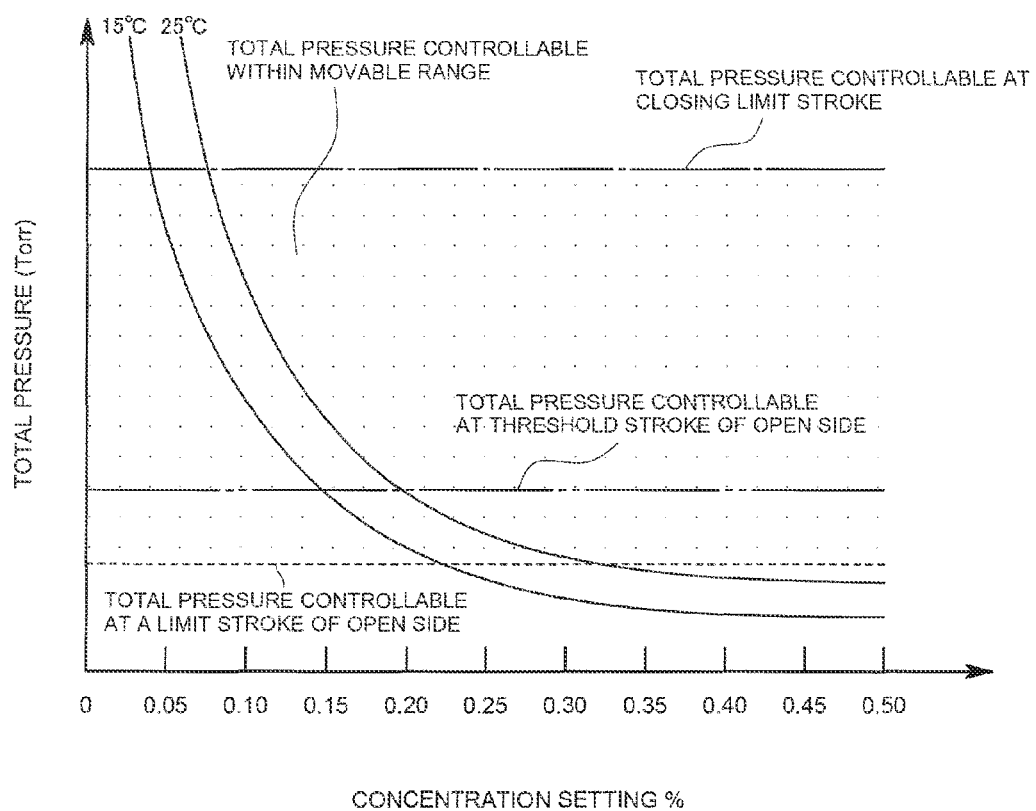
FIG. 5 is a graph illustrating that concentration control can be performed within a movable range of a first valve by changing a temperature setting in the source gas concentration control system in the same embodiment.

The reason why the first valve 23 can constantly perform the concentration control within the movable range by changing the temperature setting as described above is described with use of FIG. 5. FIG. 5 has a horizontal axis representing the concentration setting and a vertical axis representing the total pressure of the mixed gas, and indicates the total pressure at the limit stroke of the open side in the first valve 23 by a dashed line, and the total pressure at a closing limit stroke of the first valve 23 by a dashed dotted line, in which an area sandwiched between the dashed and dashed dotted lines indicates a total pressure range achievable within the movable range of the first valve 23. Also, a curve drawn by a solid line is one for the case where the partial pressure Pz of the source gas is constant at some temperature, which is drawn on the basis of the expression Pt=Pz/C. Note that the lower side curve is one for the case where the temperature of the source gas is 15° C., whereas the upper side curve is one for the case where the temperature of the source gas is 25° C.

As illustrated in FIG. 5, assuming that the concentration setting is 0.25%, in the case of the 15° C. curve, the curve is out of the limit stroke of the open side, and therefore reaches the total pressure not achievable by the first valve 23, so that the concentration control cannot be performed. However, if at the threshold stroke of the open side illustrated in FIG. 5, the temperature setting is changed to 25° C., in the case of the concentration setting of 0.25%, the total pressure is achievable within the movable range as illustrated in FIG. 5, and therefore the control to the concentration setting can be performed.

As described, according to the source gas concentration control system 100 of the present embodiment, even if the partial pressure of the source gas is reduced with keeping performing the control to keep the concentration and flow rate of the source gas constant, the temperature control mechanism 4 can change the temperature setting to a higher temperature at a time point when the stroke of the first valve 23 exceeds the threshold stroke of the open side, and thereby increase the partial pressure of the source gas to perform the concentration control within the movable range of the first valve 23. Accordingly, the problem that the stroke reaches the limit stroke of the open side to make it impossible to perform the concentration control can be prevented to constantly keep the source gas concentration constant.

Also, it is difficult to control the temperature inside the tank 13, which varies due to various factors such as an occurrence situation and remaining amount of the source gas, and the like, to a constant value even over an extremely short period of time; however, the temperature control mechanism 4 of the present embodiment is configured to change the temperature setting to roughly increase the temperature inside the tank if the stroke of the first valve 23 exceeds the threshold stroke of the open side, so that it is only necessary to perform a very simple temperature control, and therefore it is easy to achieve target control. That is, even in the case of the inexpensive temperature control device, a control instruction causing the movable range of the first valve 23 to be exceeded can be sufficiently prevented from being issued to stop operation, which is an object of the present embodiment.

Other embodiments are described. In the following description, members corresponding to those in the above-described embodiment are denoted by the same symbols.

In the above-described embodiment, by controlling the first valve 23 such that the total pressure of the mixed gas becomes equal to the pressure setting, the concentration of the source gas in the mixed gas is controlled; however, the concentration measured by the concentration measurement part CS may be used as a control parameter to control the first valve 23 to meet the concentration setting.

In the above-described embodiment, not only the concentration of the source gas, but also the flow-out flow rate of the source gas, are also controlled together; however, if it is only necessary to control the concentration, the control may be performed only with the concentration controller 2 without providing the mass flow controller 3. That is, a source gas concentration control system may be used for the source vaporization system provided with: a tank that contains a source; an inlet line that introduces carrier gas for vaporizing the contained source into the tank; and an outlet line that leads out mixed gas of source gas produced by the vaporization of the source and the carrier gas from the tank, and includes: a first valve that is provided on the outlet line; a concentration measurement part that measures a concentration of the source gas in the mixed gas; and a concentration control part that controls a stroke of the first valve such that the measured concentration of the source gas becomes equal to a predetermined concentration setting, the measured concentration being measured in the concentration measurement part.

Even in the case of such a system, the concentration of the source gas in the mixed gas is measured by the concentration measurement part, and the stroke of the first valve is controlled by the concentration control part to meet the predetermined concentration setting, so that even if a generation amount of the source gas is varied in the case where the source is not vaporized at a saturated vapor pressure in the tank, or a bubbling state is varied, or other case, the concentration can be kept constant regardless of the variation.

The concentration measurement part CS is one that calculates the concentration from the partial and total pressures, but may be one that directly measures the concentration. Also, the partial pressure measurement sensor 21 is not limited to the one based on the non-dispersive infrared absorption method, but may be one based on an FTIR spectroscopic method or laser absorption spectroscopic method.

Regarding the flow rate control of the source gas, the second valve 32 may be controlled to decrease a deviation between a flow rate setting having been set and a calculated flow rate of the source gas calculated on the basis of the measured concentration and carrier gas flow rate.

Figure 6:
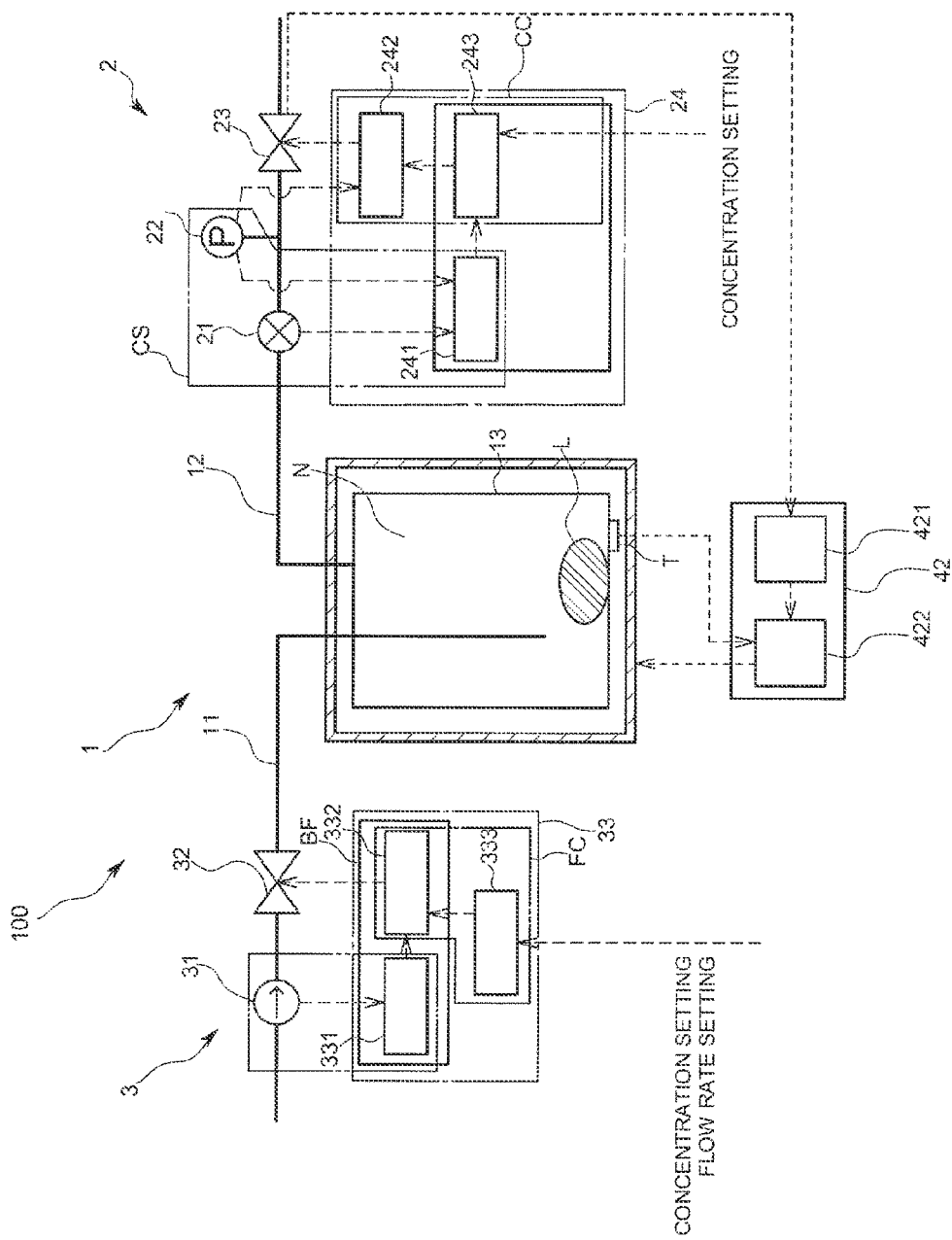
FIG. 6 is a diagram illustrating a schematic structure of a source gas concentration control system according to another embodiment of the present invention.

In the case where it is only necessary to accurately control only the concentration of the source gas in the mixed gas, and the flow rate is only required to stably flow regardless of a certain fixed value, the flow rate control may be performed without feeding back the measured concentration from the concentration controller 2 to the mass flow controller 3 as illustrated in FIG. 6. In this case, the carrier gas flow rate setting is only required to be calculated from the concentration setting and flow rate setting on the basis of Expression (3). Also, even in the case where the carrier gas flow rate setting is set in advance, and the carrier gas is made to flow at the flow rate, if the concentration is kept constant by the concentration controller 2, the flow rate of the source gas or mixed gas will be consequently constant as well. In the case of setting the carrier gas flow rate setting in advance, it is only necessary to provide a configuration such that the carrier gas flow rate setting part 333 is omitted, and the carrier gas flow rate setting is directly inputted to the second valve control part 332.

Also, in the above-described embodiment, the concentration measurement part is provided with: the pressure gauge that measures the total pressure of the mixed gas; and the partial pressure measurement sensor; however, the concentration measurement part may be one that measures the concentration by itself as an ultrasonic concentration meter, or the like. Also, the pressure gauge is used to measure the concentration and control the first valve in common; however, the pressure gauge may be separately provided for each of them, or the concentration measurement part may be one that does not use the total pressure as described above.

Figure 7:
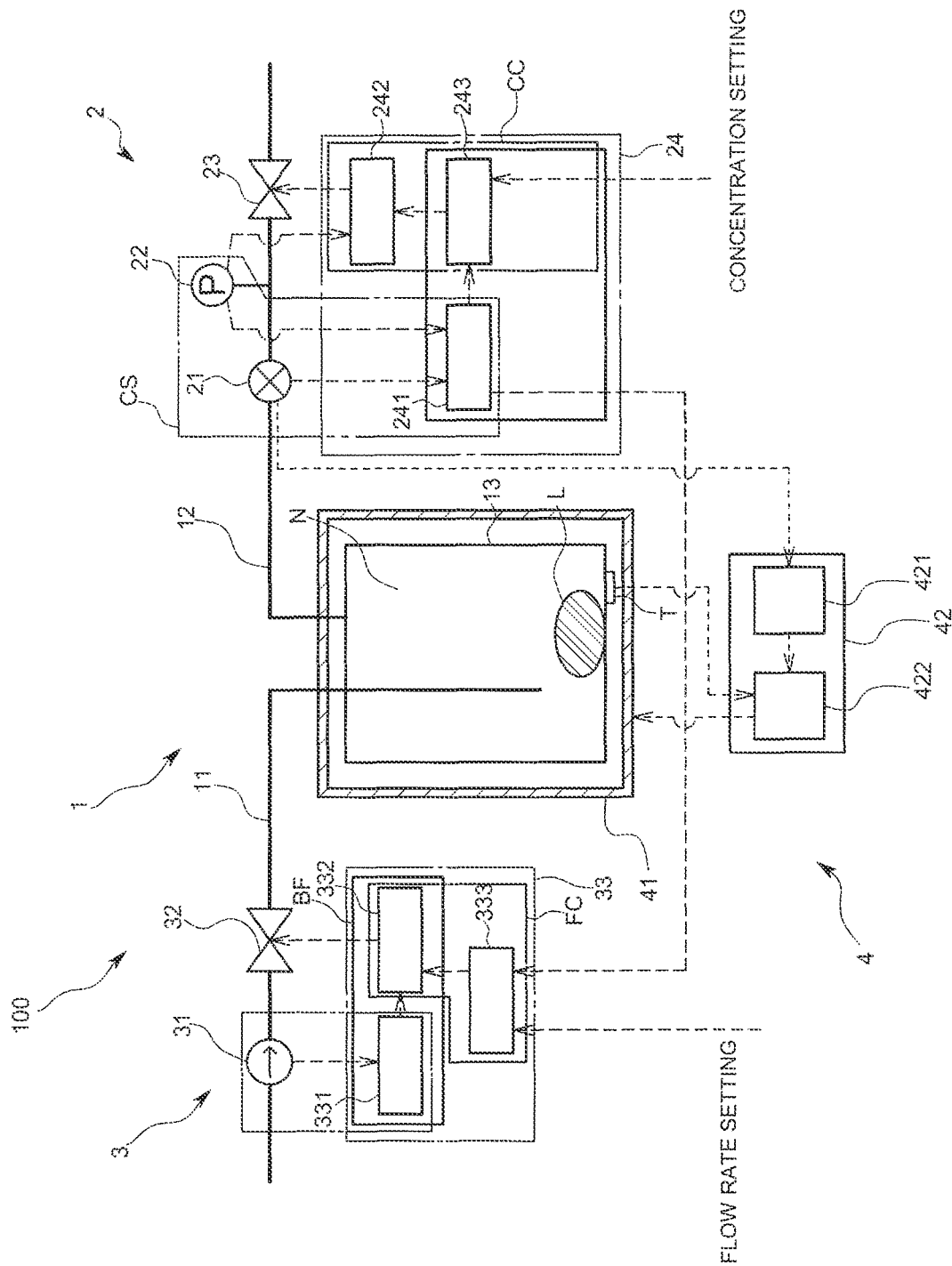
FIG. 7 is a diagram illustrating a schematic structure of a source gas concentration control system according to still another embodiment of the present invention.

In the above-described embodiment, the temperature control mechanism 4 monitors the stroke of the first valve 23 to thereby change the temperature setting; however, the temperature setting may be appropriately changed by monitoring the partial pressure of the source gas. Specifically, as illustrated in FIG. 7, if the partial pressure measured by the partial pressure measurement sensor 21 falls below a lower limit threshold partial pressure that is set on the basis of the limit stroke of open side in the movable range of the first valve 23, the temperature setting part 42 may change the temperature setting to a higher temperature than the temperature setting that is set at the time. In such a configuration, it is not necessary to monitor the stroke of the first valve 23, and by directly using a value of the partial pressure measurement sensor 21, the problem that the first valve 23 stops can be prevented.

Also, in addition to monitoring the partial pressure of the source gas to change the temperature setting, a configuration may be provided such that, for example, the total pressure of the mixed gas, which is outputted from the pressure gauge, is monitored, and if the measured total pressure falls below a lower limit threshold for the total pressure that is set on the basis of the limit stroke of the open side, the temperature setting is changed.

Figure 8:
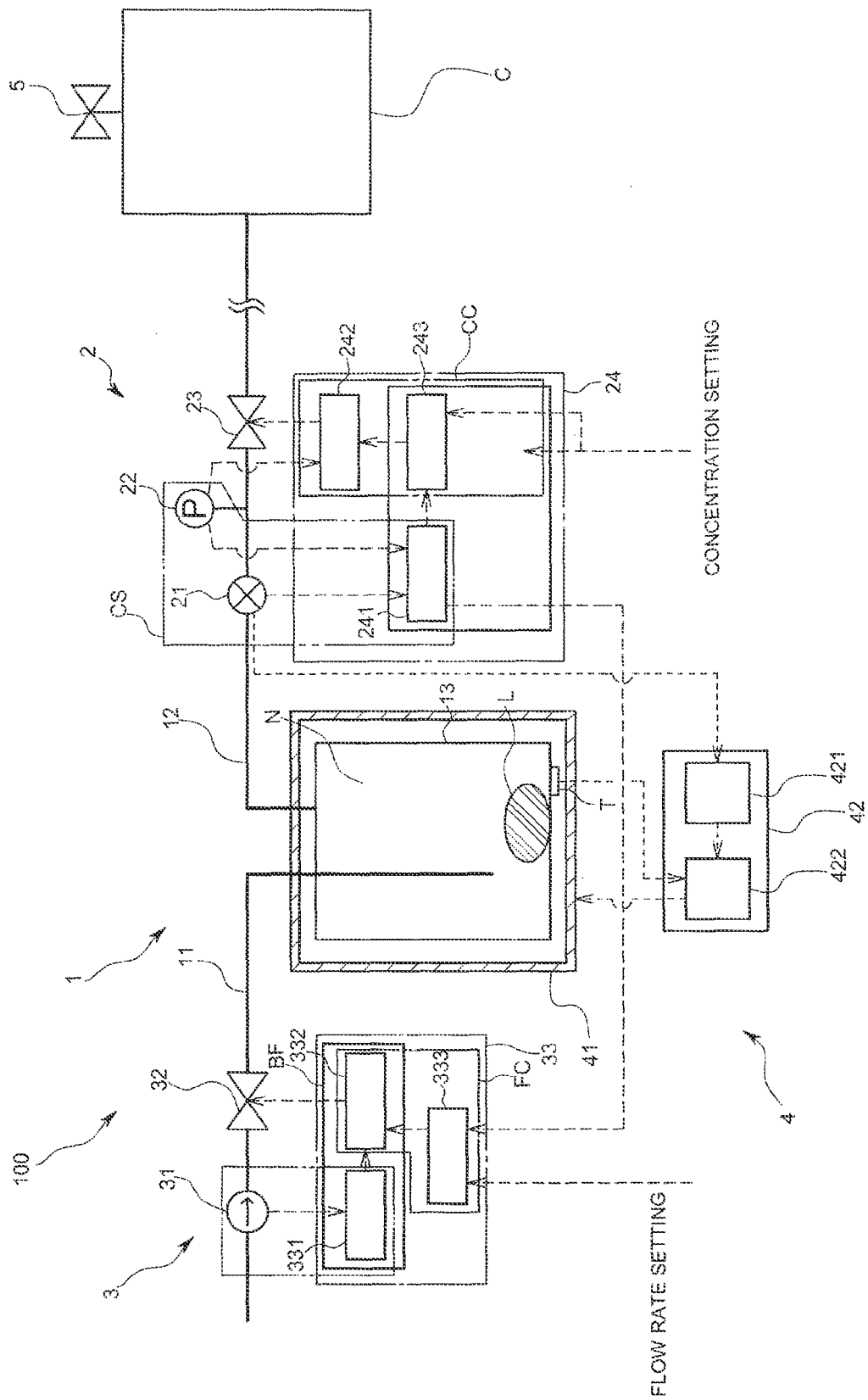
FIG. 8 is a diagram illustrating a schematic structure of a source gas concentration control system according to a different embodiment of the present invention.

In the above-described embodiment, by changing the temperature inside the tank 13 to thereby increase the partial pressure of the source gas, the control can be performed within the movable range of the first valve 23; however, any method other than changing the partial pressure of the source gas may be employed. That is, as illustrated in FIG. 8, a source gas concentration control system 100 may include: an auxiliary valve 5 that is provided on an upstream or downstream side of the first valve 23; and an auxiliary valve control part that controls a stroke of the auxiliary valve 5, wherein if a stroke of the first valve 23 exceeds a threshold stroke of the open side that is set on the basis of a limit stroke of the open side in a movable range, the auxiliary valve control part changes the stroke of the auxiliary valve 5 to a stroke on an open side more than the stroke that is set at the time.

More specifically, it is only necessary to provide a configuration such that the auxiliary valve 5 provided in a chamber C, such as a reaction chamber connected to the outlet line 12, is used, and when the stroke of the first valve 23 reaches the threshold stroke of the open side, the auxiliary valve 5 is opened to further reduce the total pressure. Also, the stroke of the first valve 23 is not monitored, but the partial pressure of the source gas may be monitored. In addition, the auxiliary valve 5 may be one that is provided in the outlet line 12.

The above-described embodiment is configured to intend to prevent the first valve from reaching the limit stroke of the open side; however, an embodiment may be configured to prevent the first valve from reaching a closing limit stroke in an opposite manner. Specifically, it is only necessary to provide a configuration such that if the stroke of the first valve falls below a closing side threshold stroke that is set on the basis of the closing limit stroke of the movable range, the temperature setting part changes the temperature setting to a lower temperature than the temperature setting that is set at the time. Such a configuration can prevent a problem that, for example, the partial pressure of the source gas becomes too high, and therefore the total pressure corresponding to the partial pressure cannot be achieved within the movable range of the first valve.

The threshold stroke of the open side is only required to be set on the basis of the limit stroke of the open side. For example, it may be a stroke between the limit stroke of the open side and a central value of the movable range, or the like. Also, an existing source gas concentration control system or the like may be installed with a program that fulfills functions as the temperature setting part and the concentration control part. Further, in the above-described embodiment, the stroke itself is monitored, and the threshold is provided for the stroke; however, a configuration may be provided such that an upper limit threshold variation rate is set for the variation rate itself of the measured stroke, and if the variation rate exceeds the upper limit threshold variation rate, the temperature setting is increased. In this case, regarding the variation rate, only an absolute value may be taken into account, or a sign may also be taken into account. Also, the threshold stroke of the open side is not changed according to the variation rate of the stroke of the first valve, but may be constantly fixed. For example, as in the case where 95% of the limit stroke of the open side is set as the threshold stroke of the open side, or other case, the threshold stroke of the open side may be fixed to a stroke having a predetermined ratio of the limit stroke of the open side.

The above-described embodiment is intended to prevent the situation where while the concentration of the source gas is kept constant, the generation amount of the source gas is reduced, and thereby the stroke of the first valve reaches the limit stroke of the open side to make it impossible to perform the concentration control; however, an embodiment may be configured to prevent a situation where, for example, while the flow rate control is performed to keep the flow rate of the source gas constant, the stroke of the valve for flow rate control similarly reaches the limit stroke of the open side to make it impossible to keep the flow rate constant. Specifically, it is only necessary that a source gas flow rate control system is used for a source vaporization system including: a tank that contains a source; an inlet line that introduces carrier gas for vaporizing the contained source into the tank; and an outlet line that leads out mixed gas of source gas produced by the vaporization of the source and the carrier gas from the tank, and includes: a second valve that is provided on the inlet line; a source gas flow rate measurement part that measures a flow rate of the source gas; a source gas flow rate control part that controls a stroke of the second valve such that the measured flow rate of the source gas becomes equal to a predetermined flow rate setting, the measured flow rate being measured in the source gas flow rate measurement part; a temperature controller that controls a temperature inside the tank so as to make the temperature inside the tank become equal to a temperature setting; and a temperature setting part that sets the temperature setting of the temperature controller, wherein if the stroke of the second valve exceeds a threshold stroke of the open side that is set on the basis of a limit stroke of the open side in a movable range, the temperature setting part changes the temperature setting to a higher temperature than the temperature setting that is set at the time. If so, by increasing the temperature of the tank, a rough flow rate of the source gas can be ensured to prevent the stroke of the second valve from reaching the limit stroke of the open side, and by operating the stroke of the second valve on a central value side to thereby be able to perform fine flow rate control, the flow rate of the source gas can be constantly kept constant. It is only necessary that the source gas flow rate measurement part is one that includes, for example, a carrier gas flow rate measurement part and the concentration measurement part, and measures the flow rate of the source gas on the basis of the above-described Expression (3).

The source is, in the above-described embodiment, a solid source, but may be a liquid source.

Besides, various modifications, and combinations of embodiments may be made without departing from the scope of the present invention.

INDUSTRIAL APPLICABILITY

According to the source gas concentration control system of the present invention, before the partial pressure of the source gas is reduced during the concentration control, and thereby the stroke of the first valve comes close to the limit stroke of the open side to make it impossible to further continue the concentration control, the temperature setting part increases the temperature setting to attempt to increase the partial pressure of the source gas to some extent, so that the total pressure to be achieved also increases to thereby be able to surely perform the concentration control within the movable range of the first valve, and the problem that the first valve reaches the limit stroke of the open side and cannot be further operated, and thereby the concentration control cannot be performed, can be prevented.

REFERENCE CHARACTERS LIST

L: Source
1: Source vaporization system (bubbling system)
11: Inlet line
12: Outlet line
13: Tank
23: First valve
CS: Concentration measurement part
CC: Concentration control part
41: Temperature controller
42: Temperature setting part
5: Auxiliary valve

The invention claimed is:

1. A source gas concentration control system used for a source vaporization system comprising a tank that contains a source, an inlet line that introduces carrier gas for vaporizing the contained source into the tank, and an outlet line that leads out gas of source gas produced by the vaporization of the source and the carrier gas from the tank, the source gas concentration control system comprising:
a first valve that is provided on the outlet line;
a concentration measurement part that measures a concentration of the source gas in the mixed gas;
a concentration control part that controls a stroke of the first valve so as to make the measured concentration of the source gas that is measured in the concentration measurement part become equal to a predetermined concentration setting;
a temperature controller that controls a temperature inside the tank so as to make the temperature inside the tank become equal to a temperature setting; and
a temperature setting part that sets the temperature setting of the temperature controller, wherein
if at a time the stroke of the first valve exceeds a threshold stroke of an open side that is set on a basis of a limit stroke of the open side in a movable range, the temperature setting part changes the temperature setting to a higher temperature than the temperature setting that is set at the time.

2. The source gas concentration control system according to claim 1, wherein
the threshold stroke of the open side is changed according to a change of rate of the stroke of the first valve.

3. A source gas concentration control system used for a source vaporization system comprising a tank that contains a source, an inlet line that introduces carrier gas for vaporizing the contained source into the tank, and an outlet line that leads out gas of source gas produced by the vaporization of the source and the carrier gas from the tank, the source gas concentration control system comprising:
a first valve that is provided on the outlet line;
a concentration measurement part that measures a concentration of the source gas in the mixed gas on a basis of a partial pressure and a total pressure, the concentration measurement part comprising a partial pressure measurement sensor that measures the partial pressure of the source gas and a total pressure measurement sensor that measures a total pressure of the mixed gas;
a concentration control part that controls a stroke of the first valve so as to make the measured concentration of the source gas become equal to a predetermined concentration setting, the measured concentration being measured in the concentration measurement part;
a temperature controller that controls a temperature inside the tank so as to make the temperature inside the tank become equal to a temperature setting; and
a temperature setting part that sets the temperature setting for the temperature controller, wherein
if at a time the partial pressure measured by the partial pressure measurement sensor falls below a lower limit threshold for the partial pressure that is set on a basis of a limit stroke of an open side in a movable range of the first valve, the temperature setting part changes the temperature setting to a higher temperature than the temperature setting that is set at the time.

4. A source gas flow rate control system used for a source vaporization system comprising a tank that contains a source, an inlet line that introduces carrier gas for vaporizing the contained source into the tank, and an outlet line that leads out gas of source gas produced by the vaporization of the source and the carrier gas from the tank, the source gas flow rate control system comprising:
a second valve that is provided on the inlet line;
a source gas flow rate measurement part that measures a flow rate of the source gas;
a source gas flow rate control part that controls a stroke of the second valve so as to make the measured flow rate of the source gas become equal to a predetermined flow rate setting, the measured flow rate being measured in the source gas flow rate measurement part;
a temperature controller that controls a temperature inside the tank so as to make the temperature inside the tank become equal to a temperature setting; and
a temperature setting part that sets the temperature setting of the temperature controller, wherein
if at a time the stroke of the second valve exceeds an open side threshold stroke that is set on a basis of a limit stroke of an open side in a movable range, the temperature setting part changes the temperature setting to a higher temperature than the temperature setting that is set at the time.

5. A source gas concentration control system program used for a source gas concentration control system used for a source vaporization system comprising a tank that contains a source, an inlet line that introduces carrier gas for vaporizing the contained source into the tank, and an outlet line that leads out gas of source gas produced by the vaporization of the source and the carrier gas from the tank, the source gas concentration control system comprising:
a first valve that is provided on the outlet line;
a concentration measurement part that measures a concentration of the source gas in the mixed gas;
a concentration control part that controls a stroke of the first valve so as to make the measured concentration of the source gas become equal to a predetermined concentration setting, the measured concentration being measured in the concentration measurement part;
a temperature controller that controls a temperature inside the tank so as to make the temperature inside the tank become equal to a temperature setting; and
a temperature setting part that sets the temperature setting of the temperature controller, wherein
if at a time the stroke of the first valve exceeds a threshold stroke of an open side that is set on a basis of a limit stroke of the open side in a movable range, the temperature setting part changes the temperature setting to a higher temperature than a temperature setting that is set at the time.

* * * * *